United States Patent

Retzbach

[11] Patent Number: 5,845,384
[45] Date of Patent: Dec. 8, 1998

[54] JOINING SYSTEM AND METHOD OF DETACHABLY AND SECURELY JOINING TWO MEMBERS

[75] Inventor: Thomas Retzbach, Bönnigheim, Germany

[73] Assignee: Fritz Schunk GmbH & Co KG Fabrik Fur Spann-Und Greifwerkzeuge, Lauffen, Germany

[21] Appl. No.: 675,462

[22] Filed: Jun. 14, 1996

[30] Foreign Application Priority Data

Jun. 14, 1995 [DE] Germany ................. 195 21 755.1

[51] Int. Cl.⁶ ..................................................... B23P 11/02
[52] U.S. Cl. ............................ 29/450; 29/252; 29/283.5; 29/282
[58] Field of Search .................... 72/402; 29/252, 29/243.52, 283.5, 816, 505, 515, 517, 520, 522.1, 450, 282

[56] References Cited

U.S. PATENT DOCUMENTS

| | | | |
|---|---|---|---|
| 3,514,843 | 6/1970 | Cernik | 72/402 |
| 5,160,108 | 11/1992 | Orain . | |
| 5,644,945 | 7/1997 | Baldwin et al. | 72/402 |
| 5,715,723 | 2/1998 | Owens | 72/402 |

FOREIGN PATENT DOCUMENTS

| | | |
|---|---|---|
| 0058309 | 8/1982 | European Pat. Off. . |
| 567191 | 9/1975 | Switzerland . |

OTHER PUBLICATIONS

Maass, *Die Ölpressverbindungen*, Werkstattstechnik (Shop Technology), vol. 51, pp. 392–396 (Aug. 91).

Kollmann, *Welle–Nabe–Verbindungen*, No. 32, pp. 156–159 (1984).

*Primary Examiner*—Robert C. Watson
*Attorney, Agent, or Firm*—Baker & Maxham

[57] ABSTRACT

A joining system for repeatedly but securely joining two members, where one member is temporarily deformed during the joining process in such a way that an effective peripheral contour corresponds to the corresponding effective peripheral contour of the other member with a given tolerance, and after the two members have been positioned, a tight pressure fit of the two effective peripheral contours is established by at least partial elastic recovery of the deformable member. According to this invention, the original peripheral contour of the deformable member has some sections inside the peripheral contour of the other member and has some sections outside that peripheral contour. The deformation of at least one member takes place through the controlled action of radial compressive forces on certain sections of the peripheral contour of the deformable member. The tight mutual pressure fit of the two peripheral contours is achieved in predetermined peripheral sections by elastic recovery of the deformable member.

13 Claims, 2 Drawing Sheets

JOINING SYSTEM AND METHOD OF DETACHABLY AND SECURELY JOINING TWO MEMBERS

BACKGROUND

1. Field of the Invention

This invention concerns a joining system and method for detachably and repeatably tightly joining of two members in generally concentric arrangements.

2. Discussion of the Related Art

A number of different press fit joining systems are known for permanently or temporarily but securely joining members, usually members that have a rotational symmetry. These known joining systems include, for example, holding clamps and expansion mandrels for centered mounting of tools or workpieces, where the fastening elements, which are usually designed as chucks or clamps, are pressed either mechanically or hydraulically against suitably designed conical faces in the axial direction. These chucking systems, which are widely used in mechanical engineering, have several disadvantages, including relatively large radial dimensions, and mistakes in curvature and relatively high friction due to the axial sliding movements between the pairs of conical contact surfaces.

For reproducible and highly accurate mounting of one member in or on another member, hydraulic expansion chucking systems are used as chucks or mandrels where the chucking force is transmitted to the member to be chucked via a hydraulic medium and a radially deformable expansion bushing. These chucking systems usually have a high technical cost.

In addition, there are known systems for producing press fit joints between two rotationally symmetrical members, where the outside diameter of the inside member, which is usually cylindrical, is slightly larger than the inside diameter of the hollow cylindrical outside member. The effective diameters of the members are adjusted by thermal treatment of one or both members, so the inside member can be inserted into the outside member and positioned in the joining position, whereupon after the thermal treatment is completed, the respective member expands or shrinks, yielding a very strong press fit of the outside member on the inside member. Disadvantages of this joining system include the measures required for the thermal treatment, in other words, the substantial heating or supercooling of the one member, the fact that changes in structure may occur as a result of heating, the danger of injury due to burns, and the time required to produce the finished joint for uniform heating and cooling of the respective shrinkage partner.

Oil press joints—for example, between a shaft and a hub—are known from the German journal *Werkstattstechnik* (Shop Technology), Vol. 51, pp. 392–396 (August 1961). With such joints, the mating surfaces are separated from each other by hydraulic oil during the joining or releasing operation. The oil pressed between the mating surfaces of the two members results in an elastic widening of the hollow cylindrical member that, for example, makes it possible to pull out the inside member which is a solid cylinder. However, this requires a very high oil pressure of up to 1500 bar that can be achieved only with technically demanding and therefore expensive equipment. In addition, this joining technique is limited to cylindrical mating surfaces.

SUMMARY OF THE INVENTION

It is a primary object of this invention to create a system for joining two members in such a way as to permit very accurate joining of members having different cross sections in a technically simple manner so it can be repeated as often as necessary.

This purpose is achieved according to this invention by the fact that the original peripheral contour of a deformable member has some sections inside and other sections outside the peripheral contour of the other member. One member is deformed by the controlled action of radial compressive forces on certain peripheral sections of its peripheral contour, and the tight mutual press fit between the two peripheral contours in predetermined peripheral sections is accomplished through elastic recovery of the temporarily deformed member.

The technical concept on which this invention is based thus consists of the fact that at least one of the members is capable of elastic deformation within certain limits and has a different peripheral contour than the other part. This member is deformed in its connecting section due to radially directed compressive forces so the shape of its peripheral contour corresponds approximately to that of the effective peripheral contour of the other member with an adequate tolerance, so the two members can be positioned inside each other. The deformed member is subject to automatic elastic recovery after the radial compressive forces are eliminated, thus resulting in a very strong press fit of certain peripheral sections of this resilient member after its recovery on the peripheral contour of the other member.

The joining system according to this invention can be used for mounting members of different shapes in various ways. Thus, in accordance with a preferred embodiment of this invention for mounting a hollow body that forms the deformable member on a solid shaft, the hollow body is provided with a polygonal inside peripheral contour consisting of arc-shaped side faces and transitional sections. Due to the compressive forces acting radially on the hollow body from the outside, this inside peripheral contour undergoes elastic deformation until it becomes congruent with the outside peripheral contour of the solid shaft so that the hollow body can be pushed onto the shaft to a predetermined position. After the radial pressure is released, the hollow body tends to return to its original peripheral contour due to its inherent elasticity, thus pressing certain peripheral sections against the outside wall of the massive shaft.

Precision centering of the hollow body, especially relatively thin-walled sockets of steel or similar materials on the shaft, can be accomplished by bringing about such a press fit in three peripheral sections that are arranged at offset angles to each other. For this purpose the effective inside peripheral contour of the socket, which is not yet deformed, has, for example, three arc-shaped side faces that are connected by three corner transitional curves, where the radial forces acting on the inside of these transitional curves cause deformation of the inside peripheral contour of the socket to an approximately circular shape, such that the diameter of this circular shape is slightly larger than the outside diameter of the shaft. The socket deformed in this way can be pushed onto the shaft. After the force stops acting on the socket positioned in this way, the socket automatically recovers, so it is pressed with a high pressure against the outside wall of the shaft in the area of the three arc-shaped side faces. The connection created in this way can also withstand very high loads and is suitable for chucking the shaft of a tool, for example, in a socket or bushing of a tool mount for machining a workpiece.

The joining system according to this invention is also suitable for mounting a hollow body that forms the deformable member in a recess in another member. For this purpose, the original outer peripheral contour of the hollow body has some peripheral sections inside the inner peripheral contour of the recess and others outside the contour. In this embodiment the radial forces act from the inside to the outside on the peripheral sections inside the contour and thus deform the peripheral contour of the hollow body in such a way that the hollow body can be inserted into the recess. After the force is no longer acting on the profile, the hollow body is subject to elastic recovery, restoring its original peripheral contour, so the sections that were originally outside the contour come to lie in close press fit with the inside wall of the recess.

In addition to accurate axial centering of both members and a high capacity to absorb even variable mechanical stresses, another advantage of the joining system according to this invention is that the joint can be created quickly and with technically simple means. The radial forces required to deform one member can be produced quickly by means of suitable equipment and can also be dissipated again just as quickly after the two members have been positioned properly relative to each other. Thus, only very little time is needed to join two members in this way—namely, approximately that time needed to chuck a tool shaft in a traditional chuck, which is very much shorter than the time required to produce a thermal shrink-fit joint. It is also especially advantageous for practical use of the joining system according to this invention that these tight connections can be released again in the same way after any length of operation. For this purpose, all that is necessary is for the radial forces to act again on the given areas of the deformable member, which can be removed from the other member after appropriate second or releasing deformation. Since the extent of the deformation required lies within the elastic range of the material used in each case, the joining and releasing operations can be repeated as often as desired, without resulting in changes in material properties, especially the structure of the material, such as those associated with thermal shrinkage.

In a process for detachable but secure joining of two members, at least one of which is capable of elastic deformation to a given extent, at least one of the members undergoes deformation during the joining operation and is positioned in the intended joining position with respect to the other member. A tight connection is established by the subsequent release of the deforming forces and the elastic recovery of this deformed member. According to this invention, an effective peripheral contour having some peripheral sections inside the effective peripheral contour of the other member and other peripheral sections outside the contour is produced on at least one of the parts. Radial forces act on predetermined peripheral sections of the peripheral contour of the deformable member, and after mutual positioning of the two members, the peripheral sections that are not exposed to radial forces are brought into a tight press fit with the peripheral contour of the other member through elastic recovery of the deformed member. For repeated mounting of a deformable hollow body on a shaft, the inside peripheral contour of the hollow body is provided with both inside and outside peripheral sections and the radial forces are directed from the outside to the inside and act on the peripheral sections located outside the peripheral contour.

For repeated mounting of an elastically deformable hollow body in a recess in a member, the outside peripheral contour of the hollow body is provided with peripheral sections lying both inside and outside the peripheral contour, and the radial forces are directed from the inside to the outside on the inside peripheral sections. This method is suitable, as an example, for mounting heat exchanger tubes in supporting walls and or tube plates.

The subject of this invention also includes a device for mounting a deformable hollow body on a shaft, consisting of a preferably cylindrical housing with a central recess, several press jaws arranged in the recess with an angle offset relative to each other, and a chucking device for forced displacement of these press jaws. According to this invention, the press jaws have a projection on their inner peripheral surface that is opposite a peripheral section of the hollow body lying outside the peripheral contour of the recess. In order to produce a force directed radially inward on each press jaw, the chucking device is designed so that when it is activated, the projection on the radial inside face of each press jaw is pressed against this peripheral section of the hollow body which projects outwardly. In accordance with an expedient embodiment of this device, a hydromechanically designed chucking device is provided for each press jaw, where a hydraulic pressure chamber is provided on the radial outside of each clamping jaw and a radially movable control element is provided in each housing.

Owing to the special advantages of this device, especially the simple operation of the control elements, which are preferably designed as bolts, as well as their small dimensions, this device is suitable especially for chucking a narrow tool shaft in a thin-walled socket of a tool mount. Because of the materials used in the drill shank and the tool socket, there are high permanent gripping forces that result in accurate axially centered positioning of the drill shank and can withstand high mechanical stresses. After deformation of the deformable socket under the influence of the chucking device and after inserting the shaft into the interior of the socket, which is then approximately circular, the control elements of the chucking device, which are preferably designed as bolts, are turned back to their starting position, so the action of the clamping jaws on the socket is terminated and this socket attempts to return to its original shape. This radial recovery causes the flattened projecting inside peripheral sections of the socket to be pressed tightly against the outside wall of the shaft. Then the chucking device can be removed axially from the assemblage of members, which is now completed.

BRIEF DESCRIPTION OF THE DRAWING

The objects, advantages and features of this invention will be more readily perceived from the following description, when read in conjunction with the accompanying drawing, in which.

DETAILED DESCRIPTION OF THE PREFERRED EMBODIMENTS

Figure 1:
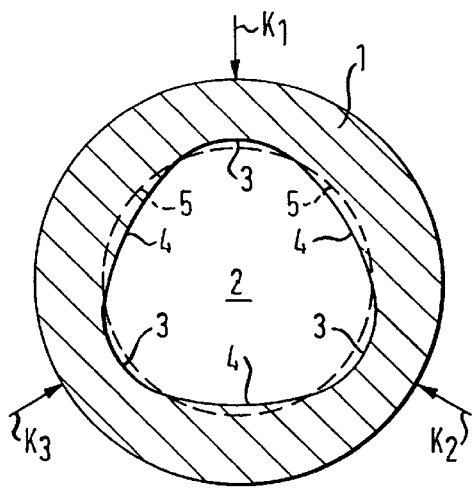
FIG. 1 is a schematic cross section of a socket to be joined with a cylindrical shaft in accordance with the invention.

According to FIG. 1, socket 1 with a cylindrical outside surface is to be mounted on cylindrical shaft 2. When applying the concept according to this invention, socket 1 has a somewhat polygonal inside peripheral contour composed of several arc-shaped sections 3, 4. As shown here, three sections 3 are located radially outside the periphery of the cylindrical shaft (indicated by circle 5 with dotted lines) and the three transitional sections 4 in between are located radially inside this periphery. In this condition, the socket cannot be pushed onto the shaft because of the interference from sections 4 located radially inside circle 5.

Figure 3A:
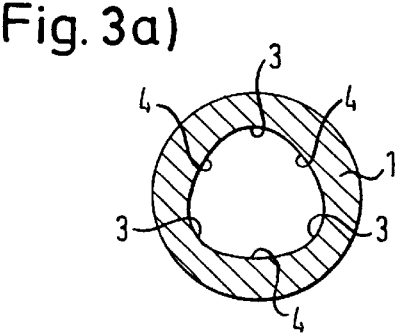
FIGS. 3a, 3b, 3c, and 3d show how the joining system according to this invention works in various phases when mounting the socket on the cylindrical shaft according to FIG. 1.
Figure 3B:
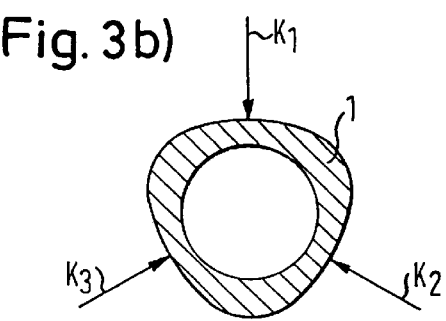
Figure 3C:
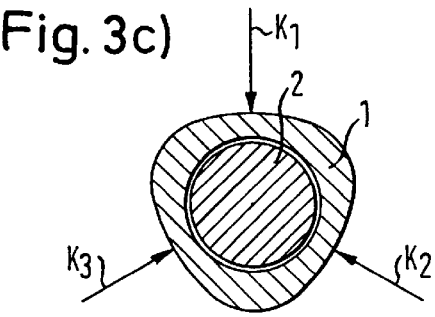
Figure 3D:
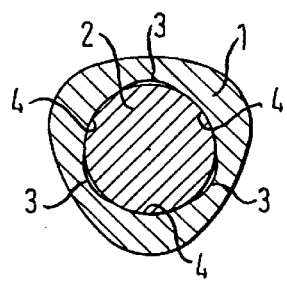

FIG. 3a shows socket 1 that has not yet been deformed. Now, if radial forces $K_1$, $K_2$ and $K_3$ (FIG. 3b) act on the outside periphery of socket 1 in peripheral sections 3 outside of circle 5, a controlled deformation of the socket takes place on the whole as the peripheral sections 3 that were previously outside of circle 5 are pressed radially inward, which results in a limited radial outward movement of peripheral sections 4 that are still inside circle 5. In this condition, as illustrated in FIG. 3b, the inside peripheral contour of the socket, which was originally approximately polygonal, has been deformed approximately to a circle having a diameter larger than the diameter of shaft 2 as indicated by circular line 5 in FIG. 1, where the outside wall of the socket has now assumed a polygonal shape. In this temporarily deformed condition, socket I can be pushed onto shaft 3 and placed in the proper position, as illustrated in FIG. 3c. When the forces $K^1$–$K_3$ stop acting, an elastic recovery occurs in socket 1 due to its inherent elastic memory, so the peripheral sections 4 that were originally inside circle 5 in FIG. 1 come into very close press fit with the outside wall of shaft 2. This final condition is illustrated in FIG. 3d.

Figure 2:
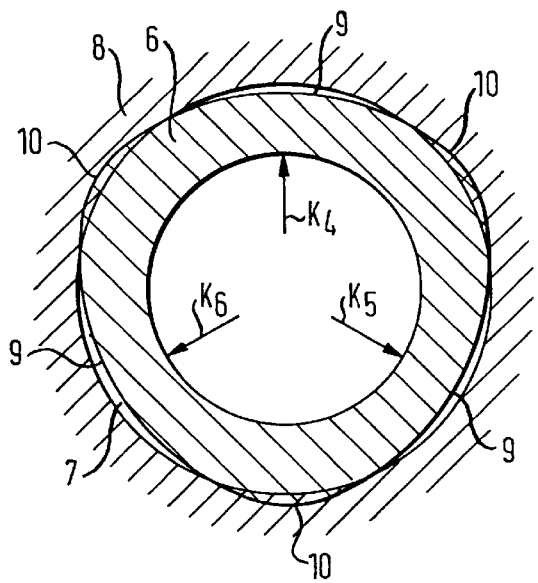
FIG. 2 shows a schematic diagram of a socket to be mounted in a cylindrical workpiece recess in accordance with the invention.

The joining system according to this invention can also be used for accurate mounting of a socket in a recess in a member, as illustrated schematically in FIG. 2. In the example illustrated here, socket 6 has a more or less polygonal outer peripheral contour, and recess 7 in member 8 has a cylindrical cross section. In order to facilitate centering, the outer peripheral contour of the undeformed socket, also in this application example, has three sections 9 inside the circular peripheral contour of recess 7 between which there are arc-shaped transitional sections 10 that are outside this cylindrical peripheral contour. If radial forces $K_4$, $K_5$ and $K_6$ are applied, which act outwardly on the socket as illustrated in FIG. 2, sections 9 on the inside are forced outward, resulting in a corresponding radially inward movement of peripheral sections 10 that originally project outwardly. The required matching of the two peripheral contours of recess 7 and socket 6 results in a condition of temporary deformation of the socket whereby the entire outside peripheral contour of socket 6, which is then approximately circular, is inside the circular peripheral contour of recess 7. In this condition, socket 6 can be inserted into recess 7. Here again, when the radial forces $K_4$, $K_5$ and $K_6$ are eliminated, socket 6 is subject to elastic recovery due to the inherent elastic properties of the material, thus resulting in a permanent pressing of the preceding areas 10 against the corresponding inside wall areas of recess 7.

The joining system according to this invention can be used to join members having different shapes, especially polygonal members, where the peripheral contours of both members must be coordinated in such a way as to permit their mutual engagement due to the controlled elastic deformation of one member. The automatic elastic recovery of this member results in a tight clamp connection without any relative movement and thus without any frictional forces acting on the interacting contact faces.

Figure 4A:
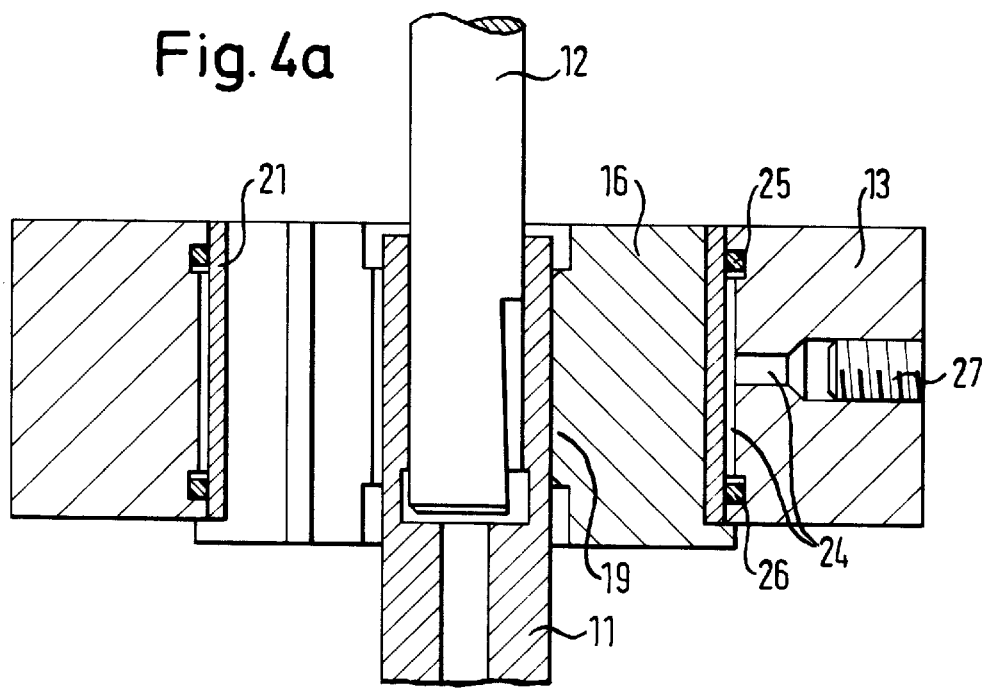
FIGS. 4a and 4b show an axial section and a top view of a device for mounting the socket on a shaft according to FIG. 3.
Figure 4B:
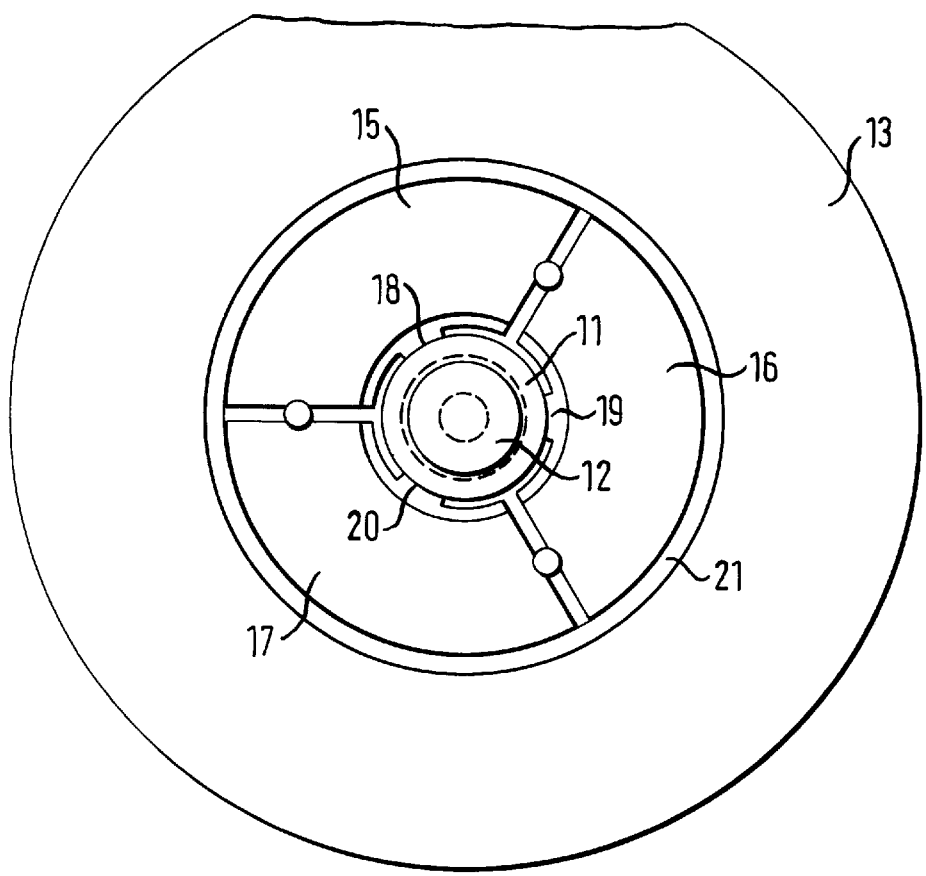

The device illustrated in FIGS. 4a and 4b is designed for practical implementation of the technical concept illustrated in FIGS. 1 and 3, where the socket-shaped end section of member 11 is to be attached to the end member of cylindrical shaft 12. This device has cylindrical housing 13 in whose central recess are arranged three clamping jaws 15, 16, 17, each of which is circumferentially spaced relative to the others by an angle of about 120°. Jaws 15–17 have respective radially inward projections 18, 19 and 20 whose axial lengths, according to FIG. 4a, determine the axial length of the connecting section. Expansion ring 21 is provided between the outside wall of clamping jaws 15, 16, 17 and housing 13 and forms the radial inner border of pressure chambers 24, which are provided in the housing and are filled with hydraulic fluid and sealed by sealing elements 25, 26. To produce a hydraulic pressure acting radially inwardly, radial control elements in the form of threaded bolts 27 are provided in housing 13. By operating these bolts, a hydraulic pressure can be built up and dissipated inside the pressure chambers 24. Tightening the sealed threaded bolts 27 leads to a build up of a hydraulic pressure in chambers 24, causing clamping jaws 15–17 to be pressed with their radially inner projections 18–20 against the predetermined peripheral sections of the socket wall, thus resulting in the deformation of the socket as discussed with reference to FIGS. 1 and 3. Loosening threaded bolts 27 by turning them back in the opposite direction causes the pressure in chambers 24 to be released and thus leads to elastic recovery of the given sections of the socket wall with the technical effects discussed above with reference to FIGS. 1 and 3.

Instead of hydromechanical adjustment of the clamping jaws, other chucking devices that operate by a suitable principle may also be used. Especially with the joining system illustrated in FIG. 2, forces $K_4$, $K_5$ and $K_6$ acting radially from the inside to the outside on the tube wall can be produced by a central cone, for example, surrounded by three clamping jaws with conical inside surfaces and pressed against the inside wall of hollow body 6 by the axial displacement of these clamping jaws in the direction in which forces $K_4$, $K^5$, and $K_6$ act.

The polygonal peripheral contour of the deformable member can be produced by machining methods, resulting in the formation of different wall thicknesses as illustrated in FIGS. 1–3. In other words, the wall thickness of hollow cylindrical member 1 or 6 is smaller in peripheral sections 3, 9 that are exposed to the influence of the deformation force than in peripheral sections 4, 10 that are pressed against the wall of the mating member 2, 8 after the elastic recovery. However, the polygonal peripheral contour can also be produced by forming under pressure, such as in a press, where in this case the wall thickness of the hollow body may remain approximately the same over the periphery.

While the embodiments shown have three angularly spaced portions upon which the deformation forces act, there could be more or fewer such portions. At least two would be necessary in accordance with the invention, but any practical number greater than three could also be handled.

In light of the above detailed description it is possible that modifications and improvements will occur to those ordinarily skilled in the relevant technical field which are within the spirit and scope of the appended claims.

What is claimed is:

1. A system for repeated tight joining of two generally concentric members which, in their non-deformed state, have at least a partial interference fit, said system comprising:

a first member having a permanent peripheral contour;

a second deformable member formed with a peripheral surface having first portions which are inside the peripheral contour of said first member and having second portions which are outside the peripheral contour of said first member;

means for applying radial forces to said second member in at least two predetermined circumferentially spaced locations to temporarily deform said second member to conform said peripheral surface to the shape of said peripheral contour of said first member to enable said first and second members to be joined together, whereby an interference fit is formed between said first and second members when the radial forces are removed from said second member and said second member returns, at least partially, to its original shape.

2. The system according to claim 1, wherein:

said first member is a rigid shaft;

said second, deformable member is a hollow body;

said hollow body has a polygonal inside peripheral contour with arc-shaped inside peripheral sections and curved outside transitional sections that can undergo elastic deformation until they are congruent with the outside peripheral contour of said rigid shaft.

3. The system according to claim 2, wherein:

said hollow body is designed as a cylindrical socket and said shaft has a cylindrical peripheral contour, where the effective inside peripheral contour of said socket is formed with three angularly spaced peripheral sections with a shallow curvature and three transitional curves, said peripheral sections and said transitional curves alternating around the peripheral contour of said socket, said socket being adapted to be deformed to an approximately circular shape by radial forces acting radially inward on said transitional curves, where the largest diameter of the peripheral contour of said deformed socket is slightly larger than the diameter of said shaft.

4. The system according to claim 1, wherein:

said first member is formed with a recess therein;

said second deformable member is formed as a hollow body;

the original outer peripheral contour of said hollow body has some sections inside the peripheral contour of the recess and other sections outside the peripheral contour of the recess and it is deformable by the radial forces acting radially outward on the sections inside the peripheral contour of the recess.

5. The system according to one of claims 1 to 4, wherein the effective peripheral contours of the two members are quadrilateral or polygonal with arc-shaped sections.

6. The system according to one of claims 1 to 4, wherein:

said deformable hollow cylindrical member has a reduced wall thickness in the sections that are exposed to the forces acting radially.

7. A method for detachably tight joining of two generally concentric members which, in their non-deformed state, have at least a partial interference fit, the method comprising the steps of:

deforming at least one of the members by radial forces during the joining operation;

positioning the deformed member in the intended joining position with respect to the other member; and releasing the radial forces whereby a tight joint is created by a subsequent elastic recovery of the deformed member; wherein the peripheral contour of the deformable member is provided with some peripheral sections inside the effective peripheral contour of the other member and with other peripheral sections outside the effective peripheral contour;

the radial forces are exerted on predetermined peripheral sections of the peripheral contour of the deformable member so its effective peripheral contour corresponds to the effective peripheral contour of the other member within a given tolerance; and after positioning the two members, the peripheral sections that are not exposed to the radial forces are brought in tight press fit with the peripheral contour of the other member by elastic recovery of the deformed member.

8. The method according to claim 7, wherein the method applies for repeatable mounting of a deformable hollow body on a fixed contour shaft:

the inside peripheral contour of the hollow body is provided with some peripheral sections that are inside the effective peripheral contour of the shaft and with other peripheral sections outside the contour; and the radial forces act from the outside to the inside of the deformable hollow body are brought to bear on the peripheral sections outside the peripheral contour.

9. The method according to claim 7, wherein the method applies for repeated mounting of an elastically deformable hollow body in a recess of a fixed contour member:

the outer peripheral contour of the deformable hollow body is provided with some peripheral sections located inside the effective peripheral contour of the fixed contour member and with some peripheral sections outside the effective peripheral contour of the fixed contour member; and the radial forces act from the inside to the outside of the deformable hollow body are brought to bear on the inside peripheral sections.

10. The method according to one of claims 7 to 9, wherein:

the polygonal peripheral contour of the deformable member is produced by machining.

11. The method according to one of claims 7 to 9, wherein the polygonal peripheral contour of the deformable member is produced by compression molding without cutting.

12. A device for mounting a deformable hollow body on a shaft, comprising:

a housing having a central recess with several press jaws arranged in said recess with an angular offset relative to each other and having a chucking device for forced displacement of said press jaws;

said press jaws have on their inside peripheral surface at least one projection opposite a peripheral section of the deformable hollow body that is outside the peripheral contour of said recess;

said chucking device being shaped and configured to produce a pressure that acts radially inward on said press jaws; and said deformable hollow body having a polygonal inside peripheral contour with arc-shaped inside peripheral sections and curved outside transitional sections that can undergo elastic deformation until they are congruent with the outside peripheral contour of a rigid shaft wherein said deformable hollow body is designed as a cylindrical socket, where the effective inside peripheral contour of said socket is formed with three angularly spaced peripheral sections with a shallow curvature and three transitional curves, said peripheral sections and said transitional curves alternating around the peripheral contour of said socket, said socket being adapted to be deformed to an approximately circular shape by radial forces acting radially inward on said transitional curves, where the largest diameter of the peripheral contour of said deformed socket is slightly larger than the diameter of said shaft.

13. The device according to claim 12, wherein said chucking device is hydromechanical, having one hydraulic pressure chamber on the radial outside of each said press jaw and each has a control element arranged so it can move in said housing.

* * * * *